United States Patent
Gollnick

(10) Patent No.: US 12,006,913 B2
(45) Date of Patent: Jun. 11, 2024

(54) METHOD AND AN APPARATUS FOR COMPUTER-IMPLEMENTED MONITORING OF ONE OR MORE WIND TURBINES IN A WIND FARM

(71) Applicant: Siemens Gamesa Renewable Energy A/S, Brande (DK)

(72) Inventor: Bert Gollnick, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 131 days.

(21) Appl. No.: 17/628,404

(22) PCT Filed: Jul. 10, 2020

(86) PCT No.: PCT/EP2020/069581
§ 371 (c)(1),
(2) Date: Jan. 19, 2022

(87) PCT Pub. No.: WO2021/018551
PCT Pub. Date: Feb. 4, 2021

(65) Prior Publication Data
US 2022/0268261 A1    Aug. 25, 2022

(30) Foreign Application Priority Data
Jul. 26, 2019 (EP) ................................ 19188515

(51) Int. Cl.
*F03D 17/00*    (2016.01)
*G06T 7/00*    (2017.01)

(52) U.S. Cl.
CPC ............ *F03D 17/00* (2016.05); *G06T 7/0004* (2013.01); *F05B 2260/80* (2013.01);
(Continued)

(58) Field of Classification Search
CPC ............................. F03D 17/00; G06T 7/0004
See application file for complete search history.

(56) References Cited

U.S. PATENT DOCUMENTS

| 11,286,913 B2 * | 3/2022 | Yang ........................ G06T 7/13 |
| 2010/0013227 A1 | 1/2010 | Weitkamp |

(Continued)

FOREIGN PATENT DOCUMENTS

| EP | 2481924 A1 | 8/2012 |
| EP | 3457326 A1 | 3/2019 |

OTHER PUBLICATIONS

PCT International Search Report and Written Opinion of International Searching Authority dated Oct. 7, 2020 corresponding to PCT International Application No. PCT/EP2020/069581 filed Jul. 10, 2020.

*Primary Examiner* — Justin D Seabe
*Assistant Examiner* — John S Hunter, Jr.
(74) *Attorney, Agent, or Firm* — Schmeiser, Olsen & Watts LLP

(57) ABSTRACT

Provided is a method for monitoring one or more wind turbines in a wind farm, each wind turbine having a rotor with rotor blades which are rotatable around a rotor axis, wherein one or several times during the operation of the wind farm a process is performed that includes
  i) obtaining a digital image of the respective rotor blade, the image being a current image taken by a camera looking at the respective rotor blade;
  ii) determining one or more operation characteristics of the respective rotor blade by processing the image by a trained data driven model, where the image is fed as a digital input to the trained data driven model and the trained data driven model provides the one or more operation characteristics of the respective rotor blade as a digital output.

15 Claims, 1 Drawing Sheet

(52) U.S. Cl.
CPC . *F05B 2260/84* (2013.01); *G06T 2207/20084* (2013.01); *G06T 2207/30164* (2013.01); *G06T 2207/30168* (2013.01)

(56) References Cited

U.S. PATENT DOCUMENTS

2013/0307961 A1* 11/2013 Puigcorbe Punzano ............... F03D 17/00 348/82
2017/0089325 A1   3/2017  Timbus et al.
2019/0072082 A1   3/2019  Lysgaard et al.

* cited by examiner

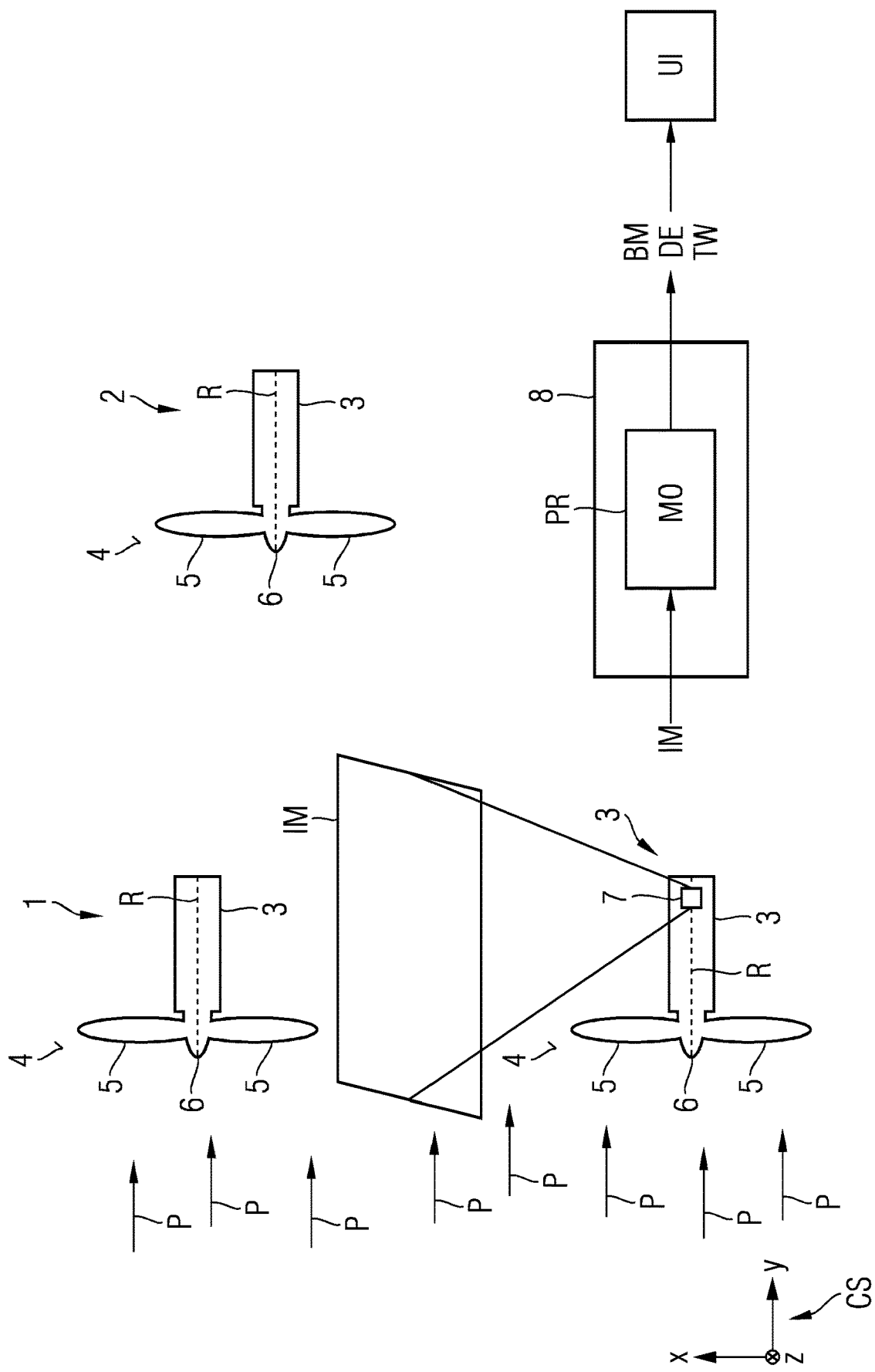

METHOD AND AN APPARATUS FOR COMPUTER-IMPLEMENTED MONITORING OF ONE OR MORE WIND TURBINES IN A WIND FARM

CROSS-REFERENCE TO RELATED APPLICATIONS

This application claims priority to PCT Application No. PCT/EP2020/069581, having a filing date of Jul. 10, 2020, which is based off of EP Application No. 19188515.1, having a filing date of Jul. 26, 2019, the entire contents both of which are hereby incorporated by reference.

FIELD OF TECHNOLOGY

The following refers to a method and an apparatus for computer-implemented monitoring of one or more wind turbines in a wind farm.

BACKGROUND

There is a need to monitor operation characteristics of rotor blades during the operation of a wind turbine in a wind farm. The operation characteristics give feedback about the forces acting on the wind turbine and enable to adapt the control strategy of the wind turbine in order to avoid damages of the rotor blades. It is known to measure the root bending moment acting on rotor blades based on strain gauges installed close to the blade root inside the blades. Those strain gauges often fail and are hard to replace due to their location at the blade root. Furthermore, the measurement precision of the strain gauges depends strongly on the position of their installation.

SUMMARY

An aspect relates to provide an easy method in order to determine one or more operation characteristics of a rotor blade of a wind turbine during operation.

Embodiments of the invention provides a method for computer-implemented monitoring of one or more wind turbines in a wind farm. Each wind turbine has a rotor with rotor blades which are rotatable by wind around a rotor axis. According to the method of embodiments of the invention, a process is performed one or several times during the operation of the wind farm. The process comprises the following steps i) and ii) performed for a respective rotor blade of one or more rotor blades of a respective wind turbine of the one or more wind turbines being monitored.

In step i), a digital image of the respective rotor blade is obtained, the image being a current image taken by a camera looking at the respective rotor blade. The term "current image" refers to an image taken during the current process being performed. The term "camera" refers to an imaging device working in at least a part of the spectrum between ultraviolet and infrared light. E.g., the camera may work in the spectrum of visible light. In a preferred embodiment, the camera works in the infrared spectrum of light so that images may also be obtained at night.

In step ii), one or more operation characteristics of the respective rotor blade are determined by processing the image by a trained data driven model, where the image is fed as a digital input to the trained data driven model and the trained data driven model provides the one or more operation characteristics of the respective rotor blade as a digital output. The data driven model is trained by training data comprising a plurality of images of the respective rotor blade taken by a camera together with the information about the one or more operation characteristics as captured in the respective image of the training data.

Embodiments of the invention has the advantage that operation characteristics of a rotor blade can be determined in an easy and straightforward manner by just taking images of the rotor blade and feeding the images to a trained data driven model. Hence, there is no need to install error prone sensors, such as strain gauges, in the wind turbine having the rotor blade to be monitored.

Any known data driven model being learned by machine learning may be used in the method according to embodiments of the invention. In a particularly preferred embodiment, the trained data driven model is a neural network, in particular a Convolutional Neural Network which is particularly suitable for processing image data. Nevertheless, other trained data driven models may also be implemented in the method of embodiments of the invention, e.g. models based on decision trees or Support Vector Machines.

In a preferred embodiment of the invention, an information based on the one or more operation characteristics (i.e. based on the digital output of the data driven model) is output via a user interface. E.g., the one or more operation characteristics themselves may be output via the user interface. Alternatively or additionally, a warning may be provided via the user interface in case that at least one of the operation characteristics does not fulfil a predetermined criterion with respect to a normal operation of the wind turbine. E.g., in case that an operation characteristic indicates an excessive load on a rotor blade, a corresponding warning may be generated via the user interface so that a human operator is informed about this operation condition and can initiate appropriate counter measures. The user interface comprises a visual user interface but it may also comprise a user interface of another type (e.g. an acoustic user interface).

In a particularly preferred embodiment, the one or more operation characteristics comprise at least one root bending moment, i.e. a bending moment acting on the attachment point on the rotor blade on the rotor hub. The at least one root bending moment comprises an edge-wise root bending moment and/or a flap-wise root bending moment. Those bending moments are well-known. The edge-wise root bending moment acts on the respective rotor blade in a rotational direction of the rotor and the flap-wise root bending moment is the bending moment acting on the respective rotor blade along the rotor axis.

In another embodiment, the one or more characteristics comprise a deflection of the tip of the respective rotor blade, i.e. the position of the tip of the rotor blade relative to the root of the rotor blade. The wind speed is determined by this deflection so that the function of an anemometer is provided. The wind speed may be output via a user interface in order to inform a human operator.

In another embodiment, the one or more operational characteristics comprise a twist of the respective rotor blade, i.e. the twist of the longitudinal axis of the respective rotor blade from the root to the tip of the rotor blade in comparison to an untwisted state, i.e. a state where no wind acts on the respective rotor blade.

The camera taking the image of the respective rotor blade may be installed in different positions. In one embodiment, the camera is installed on the nacelle of the respective wind turbine for which the process is performed. However, the camera may also be installed on the (rotating) rotor hub of the respective wind turbine for which the process is performed. In this case, the camera rotates together with the rotor and is used for monitoring a specific rotor blade of the respective wind turbine.

In another embodiment, the camera is installed on another wind turbine than the respective wind turbine for which the process is performed. In this case, the camera looks at the respective rotor blade in a direction substantially perpendicular to the rotor axis of the respective wind turbine. In other words, the optical axis of the camera is substantially perpendicular to the rotor axis.

In a particularly preferred embodiment, the angular position of the respective rotor blade around the rotor axis at the time of taking the image is fed as an additional input to the data driven model. This enables the detection of operation characteristics of rotor blades for different angular positions. In order to implement this embodiment, the training data also comprise the angular position of the respective rotor blade captured in a respective image of the training data.

In another preferred embodiment of the invention, several images of the respective rotor blade taken by the camera are possessed in step i), where the image having the best image quality according to one or more quality criteria is chosen as the image being obtained in step i). Quality criteria for defining the quality of an image are well-known for a skilled person. E.g., the quality criteria may refer to the image sharpness.

In another preferred embodiment of the invention, the process comprising steps i) and ii) is performed for several rotor blades of the respective wind turbine, where rotor blades are identified which have one or more operation characteristics with a deviation from the one or more operation characteristics of the other rotor blades higher than a predetermined threshold. Depending on the circumstances, this deviation may be defined differently. E.g., vectors comprising the (normalized) operation characteristics as entries may be used for the respective rotor blades, where the Euclidean distance of the vectors indicate the deviation.

In another embodiment, a gust with corresponding gust wind speed is detected based on the one or more operation characteristics of at least one rotor blade of the respective wind turbine for which the process is performed. It is well-known for a skilled person that there is a dependency between a gust and a change of the operation characteristics. Particularly, a gust will result in a high deflection of the tip of the respective rotor blade. The amount of this deflection is an indicator of the gust wind speed.

In a preferred variant of the above embodiment, the control of a wind turbine located downstream with respect to the wind direction relative to the respective wind turbine for which the process is performed is adapted in dependence on the gust wind speed. E.g., it may be calculated when the gust arrives at the downstream wind turbine by using the known distance between the respective wind turbine and the downstream wind turbine, where the control of the downstream wind turbine is adapted at the time of arrival of the gust.

Besides the above method, embodiments of the invention refer to an apparatus for computer-implemented monitoring of one or more wind turbines in a wind farm, each wind turbine having a rotor with rotor blades which are rotatable by wind around the rotor axis, wherein the apparatus comprises a processor configured to perform the method according to embodiments of the invention or one or more preferred embodiments of the method according to the invention.

Furthermore, embodiments of the invention refer to a wind farm comprising a number of wind turbines (i.e. at least one wind turbine), wherein the wind farm comprises the above apparatus according to embodiments of the invention in order to monitor one or more wind turbines of the wind farm.

Moreover, embodiments of the invention refer to a computer program product (non-transitory computer readable storage medium having instructions, which when executed by a processor, perform actions) with a program code, for carrying out the method according to embodiments of the invention or one or more preferred embodiments thereof when the program code is executed on a computer.

Furthermore, embodiments of the invention refer to a computer program with a program code for carrying out the method according to embodiments of the invention or one or more preferred embodiments thereof when the program code is executed on a computer.

BRIEF DESCRIPTION

Some of the embodiments will be described in detail, with reference to the following FIGURES, wherein like designations denote like members, wherein:

FIG. 1 is a schematic illustration of a wind farm comprising a controller for performing an embodiment of the invention.

DETAILED DESCRIPTION

FIG. 1 shows a plan view from above of a section of a wind farm comprising three wind turbines 1, 2 and 3 where the wind turbine 1 is monitored based on an embodiment of the invention. The whole wind farm comprises more than those three wind turbines 1 to 3. FIG. 1 also includes a 3D coordinate system CS indicating the spatial arrangement of the wind turbines 1, 2 and 3 of the wind farm. The z-axis of the coordinate system CS refers to the vertical direction whereas the x-axis and the y-axis refer to horizontal directions perpendicular to the vertical z-direction. The direction along the y-axis corresponds to the wind direction which is also indicated by a plurality of arrows P.

The construction of each of the wind turbines 1, 2, 3 is identical. I.e., each wind turbine comprises a tower (not shown), on top of which a nacelle 3 is located. A rotor 4 is attached to this nacelle. The rotor 4 comprises a rotor hub 6 from which three rotor blades 5 extend where only two of those rotor blades can be seen in FIG. 1. The rotor is rotated by wind around the rotor axis R. The rotor blades are spaced from each other around the rotor axis R by an angle of 120°. The nacelle 3 accommodates an electric generator (not shown) which converts the mechanical energy of the rotor 4 driven by wind into electric energy.

The method described herein enables the monitoring of the turbine 1 by images IM which are taken by camera 7. This camera is installed on top of the nacelle of the wind turbine 3 located adjacent to the turbine 1 in the x-direction. The camera 7 is a side looking camera and takes images of the rotor blades of the wind turbine 1. In the scenario of FIG. 1, the camera 7 looks in a direction substantially perpendicular to the rotor axis R of the wind turbine 1. In other words, the optical axis of the camera 7 is substantially perpendicular to the rotor axis R of the wind turbine 1. The camera 7 covers a wide angular range to cover the turbine 1 in many situations (for as many wind directions as possible). Furthermore, the camera is not statically mounted on the wind turbine 3 but rather adjusts itself to have the neighboring turbine 1 in its center.

The images IM of the camera 7 are used in order to determine one or more operation characteristics of a rotor blade of the wind turbine 1 for each 3600 rotation of its rotor. In the embodiment described herein, the operation characteristics of a specific rotor blade when located in the upward direction along the z-axis of the coordinate system CS are determined by taking an image IM of this rotor blade by camera 7 when the rotor blade is in the upward position. However, it is also possible to derive operation characteristics of more than one rotor blade or other rotor blades of the wind turbine 1 by taking appropriate images of these rotor blades by camera 7. Moreover, when taking the images of the respective rotor blades, the blades need not be in the upward position but may have another angular position around the rotor axis R.

A corresponding image IM taken by the camera 7 is transferred via an appropriate communication link to a controller 8 which is connected by several communication links to all wind turbines of the wind farm and controls the operation of those wind turbines. The controller 8 comprises a processor PR implementing a trained data driven model MO.

The data driven model MO is learned by a machine learning method. In the embodiment described herein, the data driven model is a Convolutional Neural Network which is particularly suitable for processing images. However, another data driven model may be used, e.g. decision trees or Support Vector Machines. The data driven model MO receives the corresponding image IM as a digital input and generates a digital output in the form of operation characteristics of the corresponding rotor blade of wind turbine 1 as captured by image IM.

In the embodiment described herein, the operation characteristics comprise root bending moments BM both in the flap-wise and edge-wise directions of the respective rotor blade. In order to generate this output, the data driven model MO is trained by training images where the edge-wise and flap-wise root bending moments are known for each training image. Those images are taken during a training phase by the camera 7 in the wind farm of FIG. 1 or by a camera in another wind farm having the same arrangement as in FIG. 1 where the images are taken from rotor blades of a wind turbine of the same type as wind turbine 1. In order to generate precise outputs by the trained data driven model MO, the training phase has covered the complete wind speed range of the wind turbine 1 from cut-in (i.e., when the wind turbine starts to generate electricity) until cut-out (i.e., when the wind turbine is switched off due to too high wind speed).

Additionally or alternatively to the root bending moments BM, other operation characteristics of the respective rotor blade may be output by the trained data driven model MO. As indicated in FIG. 1, those operation characteristics may refer to the deflection DE of the tip of the respective rotor blade, i.e. the position of the tip of the rotor blade relative to the root of the rotor blade. In another embodiment, the operation characteristics comprise the twist of the respective rotor blade, i.e. the twist of the longitudinal axis of the respective rotor blade from the root to the tip of the rotor blade in comparison to an untwisted state, i.e. a state where no wind acts on the respective rotor blade.

In order to output the operation characteristics DE and TW, the data driven model MO or additional data driven models need to be trained for these characteristics by appropriate training data. Those training data comprise images taken by the camera 7 with the additional information for each image which blade deflection DE and/or twist TW is present in the state of the turbine as captured in the image.

In the embodiment of FIG. 1, an information based on the operation characteristics is output via a user interface UI in order to inform a human operator about those characteristics. The information based on the operation characteristics may be the characteristics themselves. Alternatively or additionally, the information may be a warning in case that the operation characteristics exceed a predetermined threshold.

Furthermore, in a modified embodiment, the blade deflection DE is used for adapting the control strategy of the wind turbine 2 located in a downstream position with respect to the wind direction relative to the wind turbine 1. To do so, a wind gust (if present) is detected by analyzing the blade deflection DE. This is possible because the blade deflection is a direct measure for gust (i.e., a short-time deflection). In case that a gust is detected, the corresponding wind speed of the gust can also be derived from the blade deflection. By using the wind speed of the gust, it is determined by the controller 8 when the gust will arrive at the wind turbine 2. This determination is straightforward because the distance between both turbines 1 and 2 in the y-direction is stored in the controller 8 so that the time of arrival of the gust can be calculated by dividing the distance by the wind speed of the gust. Based on the knowledge about the time of arrival of the gust, the control strategy of the wind turbine 2 is adapted so that lower loads act on the turbine 2 when the gust arrives in order to compensate for the wind gust.

In another modified embodiment, at least one of the operation characteristics and particularly the blade deflection and the blade twist are determined for all three rotor blades of the wind turbine 1 and the values of the operation characteristics of the different blades are compared to each other. By doing so, significantly different operation characteristics of one blade in comparison to the other blades can be detected. This detection may be an indication of a malfunction of the rotor blade having significantly different operation characteristics. The information about the significantly different operation characteristics may be recorded for further analysis and/or a warning may be output via the user interface UI so that a human operator is informed about a possible malfunction of a rotor blade of the wind turbine 1.

In the embodiment of FIG. 1, the blades of a wind turbine 1 are monitored by a camera 7 installed on another wind turbine 2. However, the blades of the wind turbine 1 may also be monitored by a camera installed on the wind turbine 1 itself. E.g., a camera may be installed on the nacelle 3 of the wind turbine 1. This camera looks upwards in order to capture the rotor blade in the upward position. Moreover, a camera may also be installed at the rotor hub 6 of the wind turbine 1 which is rotating together with the blades 5. In this case, the camera looks upwards along the longitudinal axis of the blade to be monitored. In case that more than one blade shall be monitored, a camera for each blade needs to be installed at the rotor hub.

In another embodiment of the invention, several images are taken from the same rotor blade during one rotation of the rotor 4 of the wind turbine 1. Thereafter the image having the best quality according to predetermined criteria (e.g., the best image sharpness) is used as the image IM to be input to the data driven model MO. This enhances the precision of the determination of the operation characteristics by the data driven model MO. A similar method may be applied during the training phase. I.e., several images of a corresponding blade may be taken during the training phase together with the information about the operation characteristics captured by the image. The image with the best image quality is thereafter used as a training data set whereas the other images are discarded.

In another preferred embodiment, the angular position of the rotor blade 5 around the rotor axis R of the wind turbine 1 is used as an additional input for the trained data driven model. In this case, the images used for training the data driven model also include the information of the blade position being present in the respective images of the training data.

Embodiments of the invention as described in the foregoing have several advantages. Particularly, an easy and straightforward method in order to detect operation characteristics of a rotor blade of a wind turbine is provided. To do so, the operation characteristics are determined based on images of a camera via a suitably trained data driven model. As a consequence, there is no need to install sensors, such as strain gauges, for detecting the operation characteristics of the rotor blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented monitoring of one or more wind turbines in a wind farm, each wind turbine having a rotor with rotor blades which are rotatable by wind around a rotor axis, wherein one or several times during the operation of the wind farm a process is performed comprising the following steps for a respective rotor blade of one or more rotor blades of a respective wind turbine of the one or more wind turbines:
   i) obtaining a digital image of the respective rotor blade, the digital image being a current image taken by a camera looking at the respective rotor blade; and
   ii) determining one or more operation characteristics of the respective rotor blade by processing the digital image by a trained data driven model, where the digital image is fed as a digital input to the trained data driven model and the trained data driven model provides the one or more operation characteristics of the respective rotor blade as a digital output;
   wherein the camera is installed on another wind turbine than the respective wind turbine for which the process is performed.

2. The method according to claim 1, wherein the trained data driven model is a neural network, in particular a Convolutional Neural Network.

3. The method according to claim 1, wherein an information based on the one or more operation characteristics of the respective rotor blade is output via a user interface.

4. The method according to claim 1, wherein the one or more operation characteristics comprise one or more of the following characteristics:
   at least one root bending moment acting on the respective rotor blade, an edge-wise root bending moment and/or a flap-wise root bending moment;
   a deflection of the tip of the respective rotor blade, where the wind speed is determined by the deflection; and
   a twist of the respective rotor blade.

5. The method according to claim 1, wherein the camera is installed on a nacelle of the respective wind turbine for which the process is performed.

6. The method according to claim 1, wherein the camera is installed on a rotor hub of the respective wind turbine for which the process is performed.

7. The method according to claim 1, wherein the camera looks at the respective rotor blade in a direction substantially perpendicular to the rotor axis of the respective wind turbine.

8. The method according to claim 1, wherein an angular position of the respective rotor blade around the rotor axis at a time of taking the image is fed as an additional input to the data driven model.

9. The method according to claim 1, wherein in step i) several images of the respective rotor blade taken by the camera are processed, where the digital image having the best image quality according to one or more quality criteria is chosen as the digital image being obtained.

10. The method according to claim 1, wherein the process is performed for several rotor blades of the respective wind turbine, where rotor blades are identified which have one or more operation characteristics with a deviation from the one or more operation characteristics of the other rotor blades higher than a predetermined threshold.

11. The method according to claim 1, wherein a gust with corresponding gust wind speed is detected based on the one or more operation characteristics of at least one rotor blade of the respective wind turbine for which the process is performed.

12. The method according to claim 11, wherein the control of a wind turbine located downstream with respect to the wind direction relative to the respective turbine for which the process is performed is adapted in dependence on the gust wind speed.

13. A computer program product, comprising a non-transitory computer readable hardware storage device having computer readable program code stored therein, said program code executable by a processor of a computer system to implement the method according to claim 1 when the program code is executed on a computer.

14. An apparatus for computer-implemented monitoring of one or more wind turbines in a wind farm, each wind turbine having a rotor with rotor blades which are rotatable by wind around a rotor axis, the apparatus comprising:
   a processor configured to perform one or several times during the operation of the wind farm a process comprising the following steps for a respective rotor blade of one or more rotor blades of a respective wind turbine of the one or more wind turbines:
   i) obtaining a digital image of the respective rotor blade, the digital image being a current image taken by a camera looking at the respective rotor blade; and
   ii) determining one or more operation characteristics of the respective rotor blade by processing the digital image by a trained data driven model, where the digital image is fed as a digital input to the trained data driven model and the trained data driven model provides the one or more operation characteristics of the respective rotor blade as a digital output;
   wherein the camera is installed on another wind turbine than the respective wind turbine for which the process is performed.

15. A wind farm comprising a plurality of wind turbines, wherein the wind farm comprises the apparatus according to claim 14.

* * * * *